United States Patent Office 3,347,896
Patented Oct. 17, 1967

3,347,896
AMINO-ORGANOFLUOROSILANES
Bernard Kanner, Tonawanda, N.Y., assignor to Union Carbide Corporation, a corporation of New York
No Drawing. Filed Oct. 3, 1963, Ser. No. 313,420
5 Claims. (Cl. 260—448.2)

ABSTRACT OF THE DISCLOSURE

Amino-organofluorosilanes represented by the formula

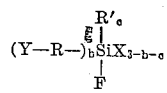

wherein R is a divalent hydrocarbon group free of aliphatic unsaturation and containing from 3 to about 10 carbon atoms, R' is a monovalent hydrocarbon group free of aliphatic unsaturation and containing from one to about 10 carbon atoms, X is selected from the class consisting of fluorine and hydrocarbyloxy groups —OR', Y is selected from the class consisting of —NHG and —NHC$_d$H$_{2d}$NG$_2$, G is selected from the class consisting of hydrogen, R' groups and C$_d$H$_{2d}$OH, b is an integer having a value from 1 to 2, c is an integer having a value from zero to 1, and d is an integer having a value from 1 to about 6, provided that (a) any nitrogen atom in the Y group is separated from silicon by at least 3 carbon atoms of an R group and (b) when 3 fluorine atoms are bonded to silicon, the nitrogen atom of any

moiety in the Y group is bonded to a carbon atom of an aromatic ring system.

This invention relates to organo-silicon compounds. More particularly, the invention is directed to a new and useful class of amino-organofluorosilanes.

The amino-organofluorosilanes of this invention are represented by the formula (A)

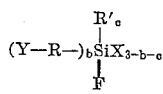

wherein R is a divalent hydrocarbon group, R' is a monovalent hydrocarbon group, X is fluorine or a hydrocarbyloxy group —OR', Y is —NHG or —NHC$_d$H$_{2d}$NG$_2$, G is hydrogen, an R' group or —C$_d$H$_{2d}$OH, b is an integer having a value from 1 to 2, c is an integer having a value from zero to 1, and d is an integer from 1 to about 6, provided that (a) any nitrogen atom in a Y group is separated from silicon by at least 3 carbon atoms of an R group and (b) when 3 fluorine atoms are bonded to silicon, the nitrogen atom of any

moiety in a Y group is bonded to a carbon atom of a fused or unfused aromatic ring system. Proviso (b) thus requires that when two X group are fluorine, any

moiety is bonded to an aromatic ring carbon atom contained in an R group, a G group, or both such groups.

The divalent hydrocarbon group R is preferably one free of aliphatic unsaturation and containing between 3 and about 10 carbon atoms. R can be, for example, an alkylene group such as propylene(1,3), butylene(1,4), hexylene(1,2), 2-ethylhexylene(1,6), and the like, a cycloalkylene group such as cyclopentylene(1,3), cyclohexylene(1,4), and the like and an arylene or alkarylene group such as phenylene(1,4), naphthalene(1,4),

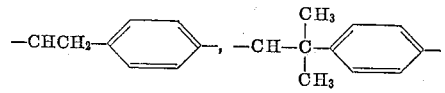

and the like.

The monovalent hydrocarbon group R' and G group (when it represents a monovalent hydrocarbon group) are preferably free of aliphatic unsaturation and contain from one to about 10 carbon atoms, for example, alkyl, cycloalkyl, aryl or alkaryl groups such as methyl, ethyl, isobutyl, hexyl, 2-ethylhexyl, cyclopentyl, 2-ethylcyclohexyl, phenyl, tolyl, mesityl, cumyl, naphthyl, and the like.

The X group in Formula A can be fluorine or a hydrocarbyloxy group —OR', where R' can be, for example, any of the monovalent hydrocarbon groups set forth in the next preceding paragraph.

The Y group in formula A can be, for example:
—NH$_2$
—NHC$_2$H$_5$
—NHC$_6$H$_5$
—NHC$_6$H$_{13}$
—NHCH$_2$CH$_2$NH$_2$
—NHCH$_2$C(CH$_3$)$_2$CH$_2$CH$_2$N(C$_2$H$_5$)$_2$
—NHCH$_2$CH$_2$CH$_2$NHCH$_2$CH$_2$OH
—NHCH$_2$CH$_2$N(C$_2$H$_5$) CH$_2$CH$_2$CH$_2$CH$_2$CH$_2$CH$_2$OH,
and the like.

Illustrative of the compounds of this invention as represented by Formula A are the following:

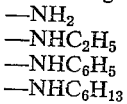

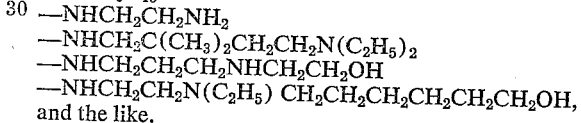

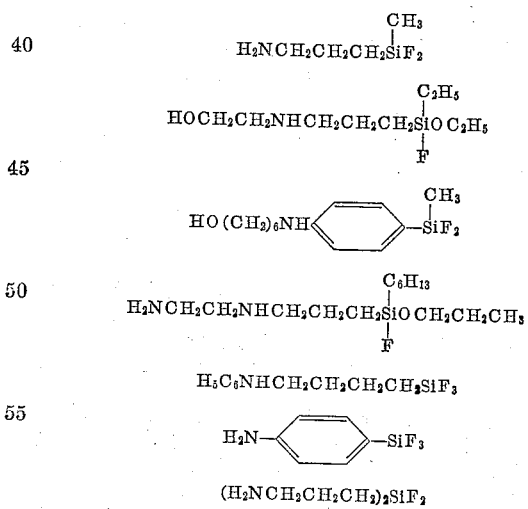

and the like.

As used herein C$_6$H$_5$, C$_6$H$_{13}$, and C$_2$H$_5$ represent the phenyl, n-hexyl and ethyl groups, respectively.

The stability of the compounds of Formula A is unexpected in view of the known reactivity of silicon-halogen bonds with nitrogen-hydrogen bonds. See, for example, "Organosilicon Compounds" by C. Eaborn, Academic Press, New York, 1960, pp. 339–343.

The amino-organofluorosilanes of this invention can be produced by one or more of several convenient methods. One method comprises the hydrogenation of a cyanoorganofluorosilane in the presence of a hydrogenation catalyst, preferably a nickel catalyst. This process is represented by the equation (not balanced):

(B) 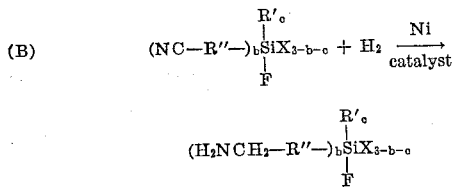

wherein X, b and c have the meanings defined with reference to Formula A, and R'' is a divalent hydrocarbon group. (The group —$CH_2$—R''— corresponds to the R group of Formula A.)

For example, gamma-aminopropylmethyldifluorosilane can be prepared by the reaction of beta-cyanoethylmethyldifluorosilane with hydrogen under pressure in the presence of a Raney nickel catalyst.

This type of reaction is described in detail in British Patent No. 882,096 and cyano-organofluorosilanes for use in this process can be prepared by any of several methods described in French Patent No. 1,303,018 and British Patent No. 912,448.

The compounds of Formula A can also be prepared by a process which comprises the reaction of a halo-organofluorosilane with ammonia or an amine, including primary amines, secondary amines, diamines, hydroxyamines and N-hydroxyalkylamines and diamines. This process can be represented by the equation (not balanced):

(C) 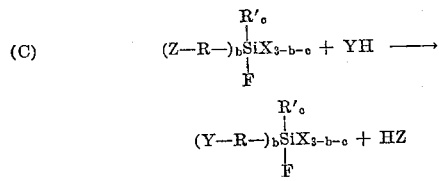

wherein Y, R, R', X, b and c have the meanings defined with reference to Formula A above, and Z is chlorine, bromine or iodine.

For example, the reaction of ammonia, phenylamine or N-(hydroxyethyl)ethylenediamine with gamma-chloropropylmethyldifluorosilane yields, respectively, $$H_2N(CH_2)_3Si(CH_3)F_2$$
$$H_5C_6NH(CH_2)_3Si(CH_3)F_2$$

and $HOCH_2CH_2NHCH_2CH_2NH(CH_2)_3Si(CH_3)F_2$. This type of reaction is also described in U.S. Patent Nos. 2,832,754 and 3,033,815 and French Patent No. 1,297,045. The halo-organofluorosilanes for use in this process can be prepared by any of several methods set forth in French Patent No. 1,303,018.

Cyano- or halo-organofluorosilanes for use in the process of Equation B or the process of Equation C and which contain both silicon-bonded fluorine atoms and silicon-bonded hydrocarbyloxy groups can be prepared by the reaction of an alcohol R'OH, wherein R' has the meaning defined hereinabove, with a mixed chlorofluorosilane. The mixed chlorofluorosilane can be prepared by the methods of French Patent No. 1,303,018. Controlled amounts of alcohol (one mole of alcohol per mole of silicon-chlorine bond) will then react selectively with the silicon-chlorine bonds to give a compound containing both silicon-bonded fluorine atoms and silicon-bonded hydrocarbyloxy groups. For example, gamma-chloropropylmethylfluoroethoxysilane can be prepared by the reaction of gamma-chloropropylmethylfluorochlorosilane with ethanol in a one-to-one mole ratio, and beta-cyanoethylmethylfluoromethoxysilane can be prepared by the reaction of beta-cyanoethylmethylfluorochlorosilane with methanol in a one-to-one mole ratio.

The amino-organofluorosilanes of this invention are useful as sizing and finishing agents for glass fibers. For example, compounds of Formula A can be employed as sizes for glass roving or yarn in order to reduce damage to the fibers caused by the fibers rubbing against each other. Also, the compounds of Formula A can be used as finishes for glass cloth where the glass cloth is used in conjunction with thermosetting organic resins to produce composite articles.

Glass cloth or fibers can be finished with compounds of this invention by applying a finishing solution containing the compounds to the cloth or fibers and evaporation of the solvent. Useful solvents include, for example, the aliphatic oxygen-containing compounds such as the alkanols and the ether-alkanols, examples of which include ethanol, propanol, methoxyethanol, ethoxyethanol, and the like, and the aromatic hydrocarbons such as benzene, toluene, xylene and the like. The preferred solvents are those non-flammable solvents such as water and those aqueous organic admixtures in which the organic constituent is a solvent for, but non-reactive with, the amino-organofluorosilane and miscible with sufficient water as to provide a homogeneous mixture therewith. The aqueous organic admixtures can contain, for example, from zero to about 60 parts water and from 100 to 40 parts of an aliphatic oxygen-containing organic compound such as ethanol. Mixtures containing 33 parts by weight of water and 67 parts by weight of an alcohol (such as methanol or ethanol) are particularly useful solvents in these finishing solutions. The finishing solution can contain from 0.2 part to 5 parts or more by weight of a silane of Formula A per 100 parts by weight of the solvent but preferably the solution contains about 1.5 parts by weight of the silane per 100 parts by weight of the solution.

When in aqueous solution the silicon-bonded fluorine atoms of the silanes of Formula A hydrolyze at a slow rate and, should such solutions be allowed to stand for a sufficiently long period, the silanes are converted to amino-organosiloxanes by hydrolysis and condensation. Admixtures of such polysiloxanes with aqueous organic compounds or with water can be employed as sizes for glass fiber rovings or finishes for glass cloth. Thus, fibrous glass, glass cloth and the like which has been treated with such solutions of the silanes of Formula A is sized or finished with the hydrolysis products of these amino-organofluorosilanes.

Finishing solutions containing the compounds of this invention can be applied to glass cloth by any suitable means (e.g., by spraying or brushing the solution on the cloth). Preferably, the solution is applied to the cloth by immersing the cloth in the solution and then squeezing out the excess solution by passing the cloth through squeeze rolls. After the finishing solution is applied to the cloth, the solvent can be volatilized by air drying the cloth at room temperature. Alternately, the fibers can be heated from 100° C. to 200° C. for one to ten minutes to promote the volatilization of the solvent in less time than is required for air drying.

Laminated products can be produced from glass cloth that is finished with an amino-organofluorosilane of this invention by standard procedures. These laminates comprise a unitary structure of multiple plies of finished glass cloth bonded together by an organic resin which has been thermoset by the application of heat. Thus, a layer of finished cloth can be coated or impregnated with a thermosetting organic resin and the process repeated until an intermediate product of the desired thickness composed of multiples layer of resin-impregnated cloth is produced. The intermediate product can be converted to or cured to produce a bonded, unitary laminate by heating the intermediate product at a cure temperature from room temperature to about 210° C. The particular cure temperature and cure time employed can vary somewhat depending upon the type of thermosetting organic resin being used. The curing can be conducted while subjecting the intermediate product to pressure in a suitable apparatus (e.g., in a hydraulic press).

Thermosetting organic resins that are suitable for use in producing laminated products with glass cloth that is finished with the compounds of Formula A include melamine (melamine-aldehyde) resins, epoxy resins, phenolic (phenolaldehyde) resins, and polyester resins. Suitable thermosetting resins include the phenol-formaldehyde resins, the phenol-acetaldehyde resins, and the melamine-formaldehyde resins. Also of considerable interest are the epoxy resins which comprise the diglycidyl ethers of polyhydric phenols (or polyhydric aliphatic alcohols) as well as blends of such diglycidyl ethers of polyhydric phenols with such modifying ingredients as the polyphenol compounds.

The chemical nature and physical properties of these common laminating resins and the use of these resins in the production of glass cloth laminates are well known and understood by those skilled in the field of resin laminates. See for example, "Plastics Engineering Handbook," Reinhold Publishing Corp., New York, 1954, Chapter 6, and R. H. Sonneborn, "Fiberglas Reinforced Plastics," Reinhold Publishing Corp., New York, 1954.

The compounds of Formula A are also useful as pigment binders for coloring fiber glass substrate materials, particularly fiber glass cloth. For use as pigment binders, an aqueous solution is prepared containing an aminoorganofluorosilane of this invention and a water-soluble organic monocarboxylic acid, such as formic, acetic and propionic acids, to solubilize the silicon compound. A suitable pigment is then dispersed in this solution by conventional methods. The fiber glass cloth is then treated with this pigment-containing dispersion and passed through a padder roll which controls the amount of dispersion retained by the cloth. The cloth is then heat-cured by conventional procedures to produce a colored fiber glass cloth which retains its color after washing in aqueous soap solution.

Operable pigments include both natural and synthetic inorganic pigments of the types of umber, sienna, ochre, aluminum, and the like, and chrome greens, iron blues, iron oxide browns and reds, zinc whites, titanium whites, ultramarine blue, lead chromate yellows, zinc chromate yellows, cadmium reds, carbon blacks and the like; and natural and synthetic organic pigments of the types of carmine, catechu, tumeric, fustic, logwood, and the like, and naphthol yellows, azo reds, lithol reds, azo oranges, indanthrene blues, indanthrene violets, toluidene yellows, phthalocyanine blues, and the like.

Specific examples of operable pigments are the following commercially available pigment formulations:

Microfix Brilliant Green G
Microfix Brilliant Blue 4G
Microfix Red R
Harshaw Permanent Carmine W-3160
Harshaw Phthalocyanine Blue W-4121
Imperse March Red X-2622
Imperse Yellow B X-2453
Imperse Green X-2454
Imperse Blue Z-2446

The following illustrative examples are presented. In the examples. "B.P." represents boiling point (at one atmosphere pressure unless otherwise indicated), "$n_D^{25}$" represents refractive index at 25° C. with reference to the sodium "D" line, "mm. Hg." is the pressure in millimeters of mercury, "NE" represents neutralization equivalent, "p.s.i.g." represents pounds per square inch gauge, and "p.s.i." represents pounds per square inch.

*Example 1*

In a 300 ml. pressure vessel was placed 101 g. (0.678 mole) of gamma-cyanopropylmethyldifluorosilane (prepared by the reaction of gamma-cyanopropylmethyldichlorosilane with sodium fluorosilicate), 75 ml. of toluene and 2 g. of nickel catalyst on an alumina support. The vessel was closed and heated with shaking to 148° C. At this point, the vessel was pressured to 1050 p.s.i.g. with hydrogen gas. As the hydrogen uptake proceeded, the vessel was repressured as needed. Within 7 minutes the temperature rose to 170° C. After 13 minutes, the reaction was essentially complete with a total of 3200 p.s.i. of hydrogen being absorbed. The vessel was then allowed to cool to room temperature. The black reaction mixture that was obtained was then filtered free of catalyst to give a clear solution. The filtrate was then subjected to vacuum fractionation using a 14-inch packed column giving 75 g. (74% yield) of delta-aminobutylmethyldifluorosilane, B.P. 63° C./20 mm. Hg, NE–152 (calc. 153).

*Example 2*

In a 300 ml. rocking autoclave was placed 34 g. (0.19 mole) of gamma - cyano - gamma - methylbutylmethyldifluorosilane (prepared by reacting gamma-cyano-gamma-methylbutylmethyldichlorosilane with sodium fluorosilicate), 100 ml. of toluene and 0.8 g. of nickel catalyst on an alumina support. The vessel was sealed and heated to 130° C. with shaking. The vessel was then pressured with 1100 p.s.i.g. of hydrogen gas. The reaction temperature gradually rose to 115° C. and a total of 800 p.s.i. of hydrogen was taken up over a period of two hours and forty minutes. After cooling to room temperature the crude product was filtered free of solids. The filtrate was then vacuum fractionated through a 14-inch Vigreux column. A total of 10 g. (28% yield) of delta-amino-gamma - gamma - dimethylbutylmethyldifluorosilane was obtained: B.P. 38.5° C. at 1.5 mm. Hg, NE 184 (calc. 191).

*Example 3*

In a 300 ml. rocking autoclave was placed 43 g. (0.25 mole) of gamma-chloroisobutylmethyldifluorosilane and 60 g. (1.0 mole) of anhydrous ethylene diamine. The vessel was sealed and heated to 180° C. with shaking. After heating for four hours, the reaction vessel was allowed to cool to room temperature. The reaction product that was collected consisted of two layers. The clear upper layer was separated from the viscous lower layer which contained a large quantity of salts. The 54 gram upper (product) layer was fractionally distilled under vacuum through a 12-inch Vigreux column. A total of 30 g. (60% yield) of N-beta-aminoethyl-gamma-aminoisobutylmethyldifluorosilane was collected: B.P. 81° C./0.6 mm. Hg, NE 97.7 (calc. 98).

*Example 4*

In a 300 ml. pressure vessel was placed 140 g. (1.5 moles) of aniline and 43 g. (0.25 mole) of gamma-chloroisobutylmethyldifluorosilane. The vessel was closed and heated to 180° C. with shaking. After heating for four hours at 180° C. the reaction vessel was allowed to cool to room temperature. The reaction product that was collected from the bomb was black and contained a large quantity of solids. About 100 ml. of benzene was added to the mixture which was then filtered. The filtrate was then fractionally distilled through a 14-inch Vigreux column to give a 70% yield of N-phenyl-gamma-aminoisobutylmethyldifluorosilane: B.P. 115° C./1.5 mm. Hg, NE 240 (calc. 229).

*Example 5*

In a 3-liter rocking autoclave was placed 600 ml. of aniline, 1 lb. of benzene and 232 g. of gamma-chloroisobutyltrifluorosilane. The pressure vessel was sealed and heated to 200° C. for 4 hours. The bomb was then allowed to cool to room temperature overnight. The product was filtered free of solids and then fractionally distilled through a 14-inch Vigreux column. A total of 225 g. of N-phenyl-gamma-aminoisobutyltrifluorosilane (B.P. 95–100° C./2.7 mm. Hg) was recovered.

*Example 6*

In a 300 ml. rocking autoclave was placed 100 g. (0.58 mole) of gamma - chloroisobutylmethyldifluorosilane (prepared by the reaction of gamma-chloroisobutyl-methyldichlorosilane with sodium fluorosilicate), 200 ml. of liquid ammonia and 100 ml. of benzene. The autoclave was then sealed and heated to 200° C. with shaking. Reaction was allowed to take place for a total of 16 hours at 200° C. The reaction mixture was then allowed to cool to room temperature overnight. The black reaction mixture obtained from the bomb was filtered free of solids with the aid of 200 ml. of benzene. The filtrate was fractionally distilled at atmospheric pressure through a 14-inch Vigreux column. About 32 grams of gamma-aminoisobutylmethyldifluorosilane, B.P. 152–154° C./747 mm. Hg, NE 157 (calc. 153), was recovered.

*Example 7*

Following the procedures of Example 6, para-aminophenylmethyldifluorosilane (B.P. 115–116° C./15 mm. Hg) can be prepared by the reaction of para-iodophenylmethyldifluorosilane and ammonia.

*Example 8*

An aqueous solution was prepared containing 1.2 wt. percent

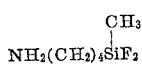

$$\text{NH}_2(\text{CH}_2)_4\overset{\text{CH}_3}{\underset{}{\text{Si}}}\text{F}_2$$

and 2.0 wt. percent Phthalo Cyanine Blue pigment paste. A sample of glass fabric was passed through this solution and then through a padder adjusted so that the wet pickup of the cloth was approximately 30 wt. percent. The cloth was air-dried for 1 hour at room temperature and then cured by heating for 3 min. at 350° C.

When a sample of cloth colored in this manner was washed in a 0.5 wt. percent soap solution at 50° C. for 5 min., the bulk of the color was retained. A cloth colored in a similar manner but without the

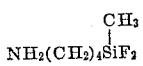

$$\text{NH}_2(\text{CH}_2)_4\overset{\text{CH}_3}{\underset{}{\text{Si}}}\text{F}_2$$

picked up color initially, but the color was almost completely removed by the washing test described above.

*Example 9*

A laminate was prepared from heat-cleaned glass cloth and a commercial phenol-formaldehyde thermosetting resin. The glass cloth was finished, prior to lamination, by immersing it in an aqueous solution containing 12 weight percent

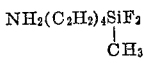

$$\text{NH}_2(\text{C}_2\text{H}_2)_4\overset{}{\underset{\text{CH}_3}{\text{Si}}}\text{F}_2$$

and then allowing the cloth to air dry at room temperature for 16 hours.

A phenolic resin laminate prepared from cloth finished in this manner had the following properties—

Flexural strength, p.s.i.:
Initial _____ 83,500
After 2 hours' boil in water _____ 79,100
Percent retention _____ 95

Typical values for a phenolic laminate prepared from heat-cleaned cloth having no finish are—

Flexural strength, p.s.i.:
Initial _____ 69,000
After 2 hours' boil in water _____ 45,000
Percent retention _____ 65

What is claimed is:
1. Amino-organofluorosilanes represented by the formula

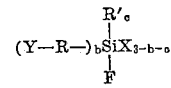

$$(\text{Y}-\text{R}-)_b\overset{\text{R}'_c}{\underset{\text{F}}{\text{Si}}}\text{X}_{3-b-c}$$

wherein R is a divalent hydrocarbon group free of aliphatic unsaturation and containing from 3 to 10 carbon atoms, R' is a monovalent hydrocarbon group free of aliphatic unsaturation and containing from one to 10 carbon atoms, X is selected from the class consisting of fluorine and hydrocarbyloxy groups —OR', Y is selected from the class consisting of —NHG and —NHC$_d$H$_{2d}$NG$_2$, G is selected from the class consisting of hydrogen, R' groups and —C$_d$H$_{2d}$OH, b is an integer having a value from 1 to 2, c is an integer having a value from zero to 1, and d is an integer having a value from 1 to 6, provided that (a) any nitrogen atom in the Y group is separated from silicon by at least 3 carbon atoms of an R group and (b) when 3 fluorine atoms are bonded to silicon, the nitrogen atom of any

$$-\overset{\text{H}}{\underset{}{\text{N}}}-$$

moiety in the Y groups is bonded to a carbon atom of an aromatic ring system.

2. The amino-organofluorosilanes in accordance with claim 1 wherein b is 1, c is 1, X is fluorine and R' is methyl.

3. The compound represented by the formula

$$\text{H}_2\text{NCH}_2\text{CH}_2\text{CH}_2\text{CH}_2\overset{\text{CH}_3}{\underset{}{\text{Si}}}\text{F}_2$$

4. The compound represented by the formula

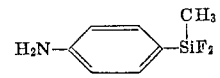

5. The compound represented by the formula

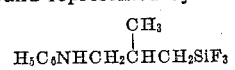

$$\text{H}_5\text{C}_6\text{NHCH}_2\overset{\text{CH}_3}{\underset{}{\text{CH}}}\text{CH}_2\text{SiF}_3$$

wherein H$_5$C$_6$ represents the phenyl group.

References Cited

UNITED STATES PATENTS 2,968,666  1/1961  Pepe _____ 260—448.8
3,170,891  2/1965  Speier _____ 260—448.2

TOBIAS E. LEVOW, *Primary Examiner.*

P. F. SHAVER, *Assistant Examiner.*